United States Patent [19]

Gates

[11] Patent Number: 5,608,530
[45] Date of Patent: Mar. 4, 1997

[54] INSPECTION DEVICE FOR MEASURING A GEOMETRIC DIMENSION OF A PART

[75] Inventor: Donald C. Gates, Troy, Mich.

[73] Assignee: General Inspection, Inc., Davisburg, Mich.

[21] Appl. No.: 288,083

[22] Filed: Aug. 8, 1994

[51] Int. Cl.⁶ .................................................. G01B 11/08
[52] U.S. Cl. ..................................... 356/384; 250/559.24
[58] Field of Search ..................................... 356/384, 385, 356/386, 387; 250/559.24

[56] References Cited

FOREIGN PATENT DOCUMENTS

| 0256539 | 2/1988 | European Pat. Off. . | |
|---|---|---|---|
| 260983 | 10/1988 | German Dem. Rep. | 356/385 |
| 57-161608 | 10/1982 | Japan . | |
| 60-142204 | 7/1985 | Japan . | |

OTHER PUBLICATIONS

Software assisted application of sensors in small–batch production: article from Technisches Messen TM 1982–1988, incomplete, vol. 56, No. 10, Oct. 1, 1989, pp. 400–403.

*Primary Examiner*—F. L. Evans
*Attorney, Agent, or Firm*—Dinnin & Dunn, P.C.

[57] ABSTRACT

A laser for producing a beam of radiation which is then refined in cross sectional dimension by use of plano-cylindrical lenses. The refined beam of radiation falls incident on a part to be measured. The unobstructed portion of the beam is then bifurcated by a pair of reflective surfaces which produce non-parallel radiating beams; each beam comprised of the unobstructed portion of radiation-which has passed radially opposed halves of the part. The magnitude of radiation present in each non-parallel radiating beam is then measured.

30 Claims, 3 Drawing Sheets

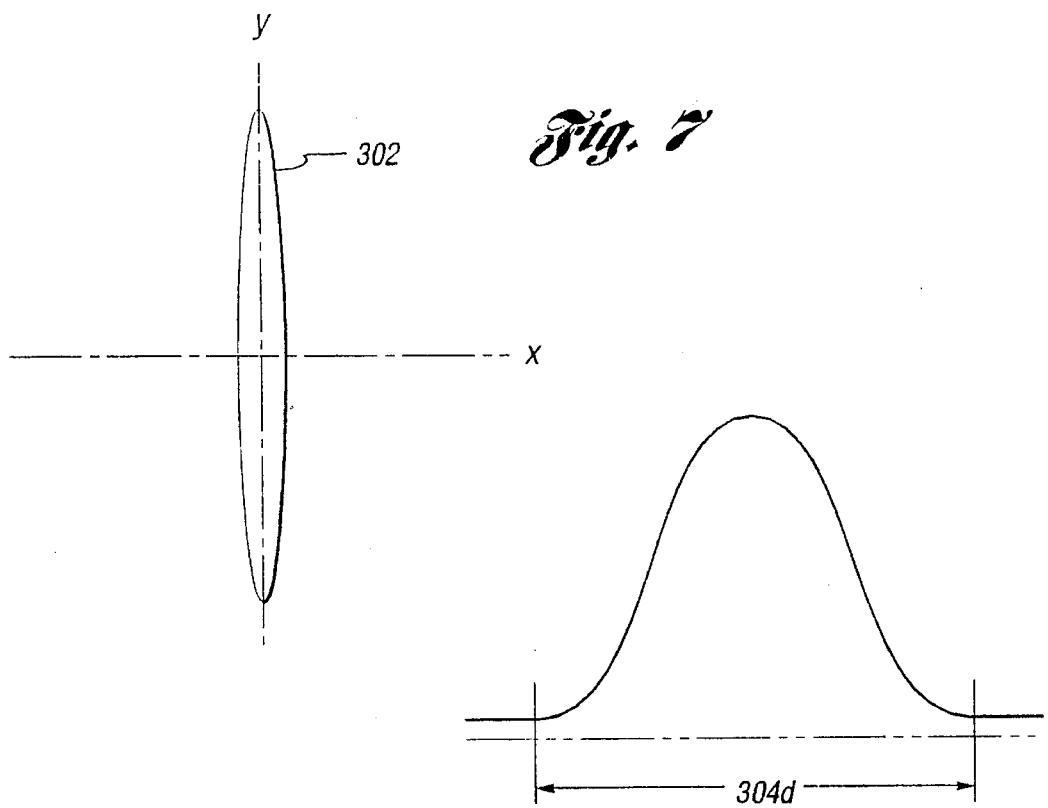
Fig. 7
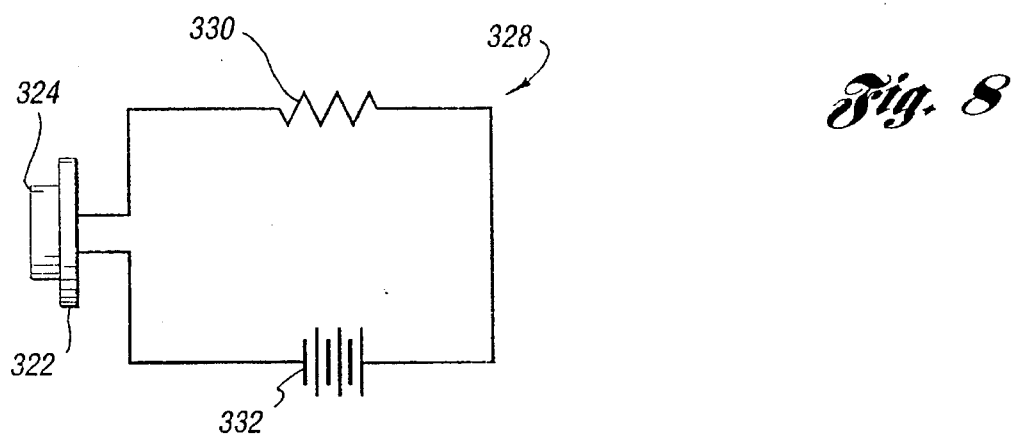
Fig. 8
Fig. 9
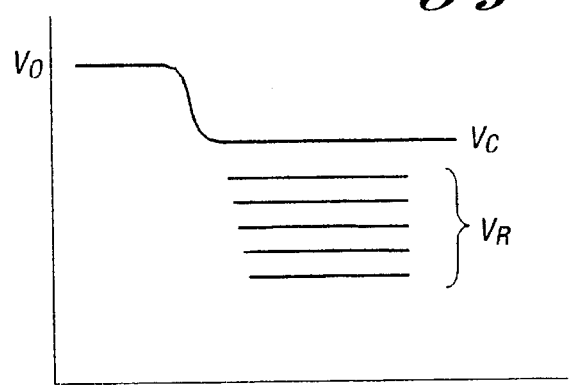
Fig. 10

5,608,530

INSPECTION DEVICE FOR MEASURING A GEOMETRIC DIMENSION OF A PART

BACKGROUND OF THE INVENTION

1. Field of the Invention

This invention relates to inspection devices and, more particularly, to an inspection device which utilizes dual radiation detectors to identify a geometric dimension of a part.

2. Description of the Related Art

Lasers have been known and used for measuring the geometric dimensions of a part. Such techniques as shown in FIG. 1 involve positioning a part in the path of a single laser beam 99 thereby obstructing a portion of the beam. The magnitude of radiation present in unobstructed portions 100, 102 then falls incident upon a singular measuring device which converts the magnitude of radiation present in portions 100, 102 to a voltage value which is proportional to a respective physical dimension. Such a technique is not capable of discerning the concentricity of a part as the effective axis 108 of the part may shift (i.e., a non concentric part) in the beam without affecting the total magnitude of radiation which is incident on the measuring device.

Techniques shown in FIG. 2 have been developed which utilize two non-parallel, preferably co-planar laser beams 200 and 210 and two light measuring devices (not shown) to monitor the magnitude of light present in unobstructed portions 202, 212. The part 203 is positioned in the non-parallel beams so that a first portion incident on part 203 is obstructed; whereas a second portion remains unobstructed. By positioning each laser to produce non-parallel paths through the part, any off-axis dimensional characteristic of the part may be detected as a change in magnitude of radiation present in unobstructed portions 202, 212. Co-planar laser beams are necessary to ensure that each beam is incident at the same cross-section of the part. A non-planar analysis performed by non-planar beams will not produce an accurate measure of the part cross section. Two lasers, two detectors and substantial space is required to accommodate such dual non-parallel laser inspection devices. Therefore, there is a need to reduce the number of lasers and provide a package efficient inspection device. In addition, the dual laser systems are typically mounted on a planar structural member in attempt to produce co-planar laser beams. Such a mechanical attempt to achieve co-planar beams is very complex and sensitive to physical disturbance resulting in an expensive and unreliable solution. Therefore, there is a need to provide a low cost and reliable inspection device which is capable of inspecting the cross-section of a part using a single laser beam.

SUMMARY OF THE PRESENT INVENTION

The present invention utilizes a laser for producing a beam of radiation which is then refined in cross sectional dimension by use of plano-cylindrical lenses. The refined beam of radiation falls incident on a part to be measured. The unobstructed portions of the beam are then redirected by a pair of reflective surfaces producing non-parallel radiating beams; each beam comprises of the unobstructed portion of radiation which has passed radially opposed halves of the part. The magnitude of radiation present in each non-parallel radiating beam is then measured. The magnitude of radiation measured is proportional to a dimensional measurement.

These and other aspects of the present invention will become more readily apparent by reference to the following detailed description of the embodiments as shown in the drawings.

BRIEF DESCRIPTION OF THE DRAWINGS

FIG. 7 is a cross-section taken at line 7—7 of FIG. 3;

FIG. 8 is a distribution of energy magnitude taken along the Y axis of FIG. 7;

FIG. 9 is an electrical schematic which may be used to process an output of the present invention; and FIG. 10 is a voltage signal which is produced by the present invention used to inspect various parts.

DETAILED DESCRIPTION OF THE PREFERRED EMBODIMENT

Figure 3:
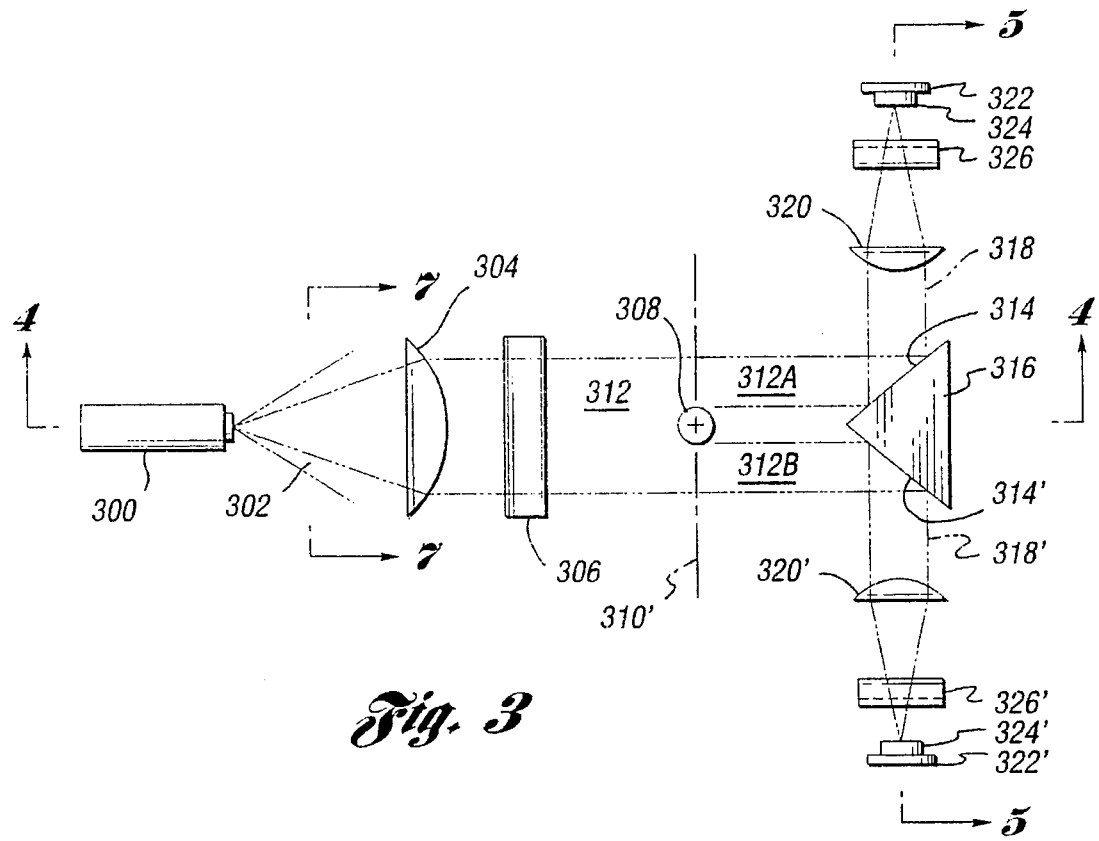
FIG. 3 is a partial schematic shown in side view of the present invention.
Figure 4:
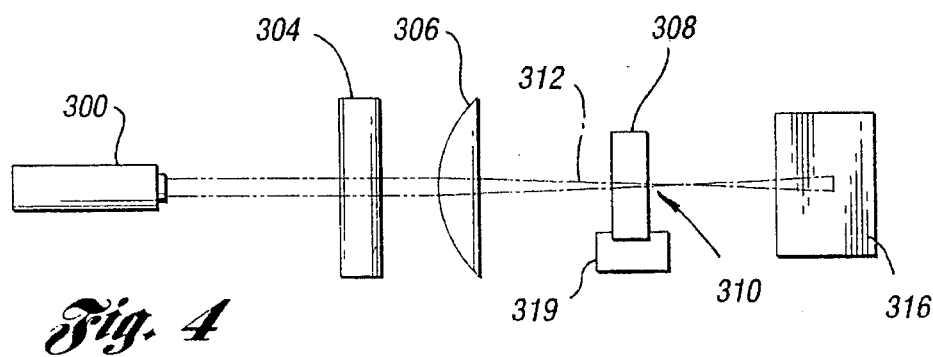
FIG. 4 is a plan view taken along 4—4 of FIG. 3.
Figure 5:
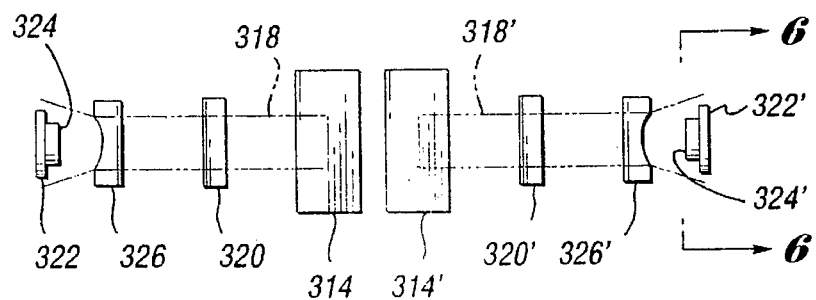
FIG. 5 is an end view of the present invention taken along 5—5 of FIG. 3.

The present invention, as shown in FIG. 3, 4 and 5, includes a radiation source provided by a line generating laser 300 producing a laser beam 302 characterized by a beam width of 0.8 mm and a height characterized by radiation emanating at an included angle of 60 degrees from the point source.

The beam 302 as shown in cross-section in FIG. 7, features a distribution of energy as shown in FIG. 8. Plano-cylindrical lens 304 truncates the lower magnitude energy portion outside dimension 304d by means of its dimension and position in beam 302. Lens 304 is positioned such that the axis of radius of the lens is oriented perpendicular to the beam line and the curved surface of lens 304 faces away from laser 300 producing a beam of constant height.

Plano-cylindric lens 306 is positioned such that the axis of radius is in-line with the constant height of the beam and the curved surface is oriented toward laser 300. Lens 304 produces a beam of constant height and lens 306 focuses the beam to a focal point 310 shown in FIG. 4 which forms a line 310' in FIG. 3.

Precision measurement of a dimensional characteristic is achieved by minimizing the laser beam width and positioning the part at the point of minimum beam width. Such may be achieved by using optical devices which produce a focal line at which the part is positioned for measurement.

A part 308 positioned in beam 312 at or near focal point 310 will obstruct a portion of beam 312. The unobstructed portions 312A, 312B passing opposed radial sides represent the dimensional characteristics of part 308. Next, the unobstructed portions 312A and 312B of beam 312 are redirected by reflective surfaces 314, 314' defined on prism 316 into two non-parallel radiating beams 318, 318'.

Figure 1:
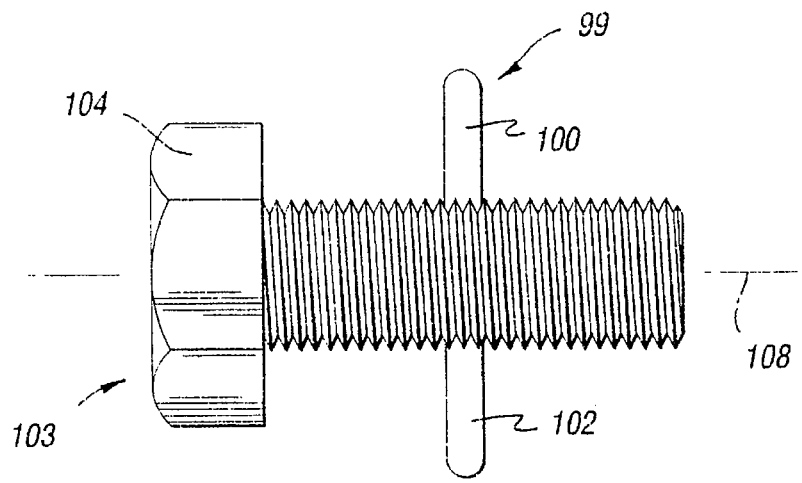
FIG. 1 is a side view of a part in a radiation beam used in a first prior art device.
Figure 2:
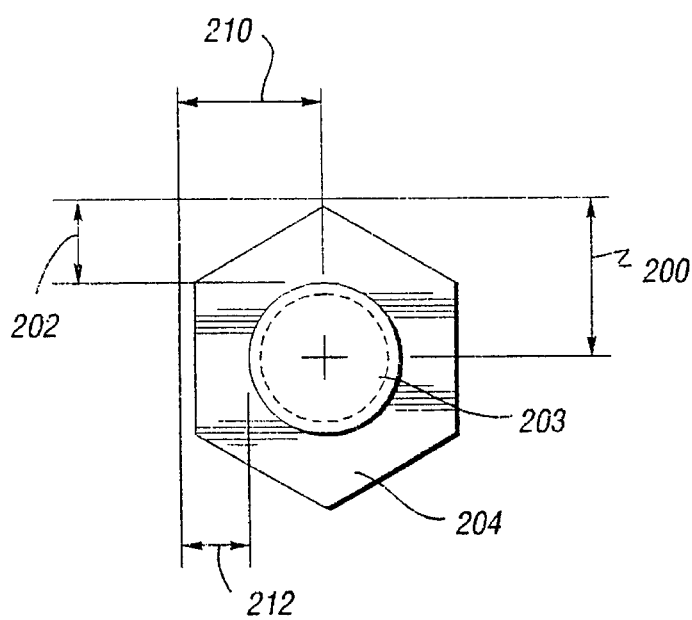
FIG. 2 is a cross-sectional view of a part in a second prior art device which uses two non-parallel laser beams.
Figure 6:
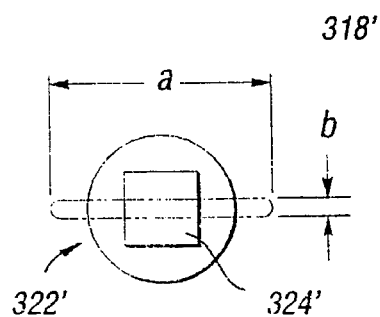
FIG. 6 is a cross sectional view of the present invention taken along 6—6 of FIG. 5.

Plano-cylindrical lenses 320, 320' focus beams 318, 318' to a beam height dimension -b- which is smaller than the dimension of sensing elements 324, 324' of the photo detectors 322, 322'0 as shown in FIGS. 3 and 6. Plano-cylindrical lens 320, 320' are oriented with the curved surfaces toward the direction from which radiating beams 316, 316' originate.

Lens 326, 326' are negative concave lenses which widens beam 316, 316' preferably to a which is beam width dimension -a- greater than the respective dimensions of sensing elements 324, 324' of photo detectors 322, 322'. In this manner, the resolution of the present invention is enhanced; that is, all beam length information is captured. The beam height is representative of the measured part dimension whereas the beam width contains no information and in fact can cause inaccuracy of measurement. By using a sensing elements 324, 324' which offers a smaller dimension than the corresponding incident beam widths, any fringing effect is eliminated and a more accurate measurement can be performed.

FIG. 9 illustrates the electrical circuitry in simplified form which allows one to practice the present invention. Photo diode 322 is shown connected to circuit 328 which includes resistor 330 and voltage source 332. A voltage measuring device may be used to convert information in beams 318, 318' to a voltage which is representative of the radial dimension of part 308.

FIG. 10 illustrates graphically the various voltage values that will be produced when parts of various radial dimensions are measured; Vo will be produced if no part is present in the laser beam; Vc will be produced if a part of the correct radial dimension is being tested, and Vr will be produced if a part having radial dimensions greater than the correct radial dimension is being tested. Such a feature may be used to sort parts. Techniques to move part 308 axially while measuring the geometric dimensions of part 308 will provide a complete analysis of part 308.

Comparisons of the collected geometric dimensions can be performed to determine if part 308 satisfies predetermined criteria. In addition, part 308 may be rotated about its axis to perform an analysis of the concentricity of the part. Rotation will also assist in identification of defects which may not extend over 180 degrees of the part surface.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. An inspection device for measuring geometric dimensions of a part comprising;
   a first radiation source generating a first radiation beam having a width converging to a focal line and a length at the focal line which is greater than a dimension of the part to be inspected, so that a part positioned proximate the focal line to partially obstruct said beam, bifurcates said beam into first and second unobstructed portions;
   means for positioning said part in said beam in a predetermined position proximate said focal line; and
   first and second radiation measuring devices positionally disposed to measure radiation magnitudes present in respective first and second unobstructed portions of said beam.

2. The invention of claim 1 further comprising a reflective device defining first and second reflective surfaces disposed in a position in which said first and second unobstructed portions of said beam fall incident wherein said first and second unobstructed portions are redirected resulting in non-parallel radiating first and second beams.

3. The invention of claim 2 wherein said non-parallel radiating first and second beams are characterized by a converging height, corresponding to the unobstructed length of the focal line portion, and a diverging width.

4. The invention of claim 1 wherein said first radiation source is a laser which produces a diverging beam of radiation which is incident on an optical device that redirects said beam of radiation into a shape characterized by a substantially constant length and a width which converges to a focal line at a location displaced from said optical device.

5. The invention of claim 2 wherein said reflective device comprises a prism having a pair of reflective surfaces oriented substantially 90 degrees with respect to one another.

6. The invention of claim 4 wherein said optical device comprises a first and second lens.

7. The invention of claim 6 wherein said first and second lenses are plano-cylindrical lenses.

8. The invention of claim 2 wherein said non-parallel radiating first and second beams are each incident upon first and second optical devices which produce respective third and fourth beams each being incident on respective said first and second radiation measuring devices.

9. The invention of claim 2 wherein said non-parallel radiating first and second beams are each incident upon respective first and second optical devices which produce respective third and fourth beams each being characterized by converging height and diverging width dimensions;
   said first and second radiation measuring devices each being characterized by respective first and second portions performing a sensing function;
   said first and second portions each having a first dimension extending parallel to the orientation of the height dimension of said third and fourth beams and a second dimension oriented orthogonal thereto, and
   said first and second radiation measuring devices being located respective of said third and fourth beams at a location at which each of said third and fourth beams has a height which is smaller than said first dimension of said first and second radiation measuring devices.

10. The invention of claim 2 wherein said non-parallel radiating first and second beams are each incident respective first and second optical devices which produce respective third and fourth beams each being characterized by converging height and diverging width dimensions;
    said first and second radiation measuring devices each being characterized by respective first and second portions performing a sensing function;
    said first and second portions each having a first dimension extending parallel to the orientation of the height dimension of said third and fourth beams and a second dimension oriented orthogonal thereto, and
    said first and second radiation measuring devices being located in respective of said third and fourth beams at a location at which each of said third and fourth beams has a width which is greater than said second dimension of said first and second radiation measuring devices.

11. The invention of claim 8 wherein each of said first and second optical devices comprises a third and a fourth optical device.

12. The invention of claim 11 wherein said third optical device is a plano-cylindrical lens and said fourth optical device is a negative plano-concave cylindrical lens.

13. The invention of claim 9 further comprising a means for converting the radiation present in said third and fourth beams into a voltage value.

14. The invention of claim 10 further comprising a means for converting the radiation present in said third and fourth beams into a voltage value.

15. The invention of claim 14 wherein said means for converting the radiation present in said third and fourth beams into a voltage value is a first and second photo diode.

16. A method for measuring the geometric dimensions of a part comprising the steps of:

producing a first radiation beam;

modifying the first radiation beam using an optical device formed by a first and second lens causing the beam width to converge to a focal line which has a length greater than the dimension of the part to be inspected;

positioning said part in said beam in a predetermined position at least partially obstructing said beam producing a detected radiation beam having first and second unobstructed portions wherein each of said first and second portions contain a magnitude of radiation which is representative of a respective geometric dimension; and measuring said magnitude of radiation present in each of said first and second unobstructed portions.

17. The method for measuring the geometric dimensions of a part as in claim 16 comprising the additional step of redirecting said first and second unobstructed portions using a pair of reflective surfaces to produce non-parallel radiating first and second beams.

18. The invention of claim 16 wherein said first radiation beam is produced by a laser which forms a diverging beam of radiation which is incident on an optical device that redirects said diverging beam of radiation into a shape characterized by a substantially constant length and a width which converges to a focal point at a location displaced from said optical device.

19. The invention of claim 16 wherein said first and second lenses are plano-cylindrical lenses.

20. The invention of claim 16 wherein said part is positioned in said beam in a predetermined position proximate said focal line.

21. The invention of claim 16 wherein said first and second unobstructed portions are incident on respective first and second reflective surfaces producing oppositely directed radiating beams.

22. The invention of claim 17 wherein said reflective surfaces comprise first and second reflective surfaces which are disposed at an angle with respect to one another which is substantially 90 degrees.

23. The invention of claim 22 wherein said first and second reflective surfaces are provided by first and second reflective surfaces defined on a prism.

24. The invention of claim 16 wherein said first and second unobstructed portions of said first radiation beam are each incident upon first and second optical devices which produce respective third and fourth beams each being incident on respective first and second radiation measuring devices.

25. The invention of claim 16 wherein said first and second unobstructed portions of said first radiation beam are each incident upon respective first and second optical devices which produce respective third and fourth beams each being characterized by converging height and diverging width dimensions and being incident on respective first and second radiation measuring device;

said first and second radiation measuring devices each being characterized by respective sensing portions performing a sensing function;

said sensing portions each having a first dimension extending parallel to the orientation of the height dimension of said third and fourth beams and a second dimension oriented orthogonal thereto, and said first and second radiation measuring devices being located in respective of said third and fourth beams at a location at which each of said third and fourth beams has a height which is smaller than said first dimension of said first and second radiation measuring devices.

26. The invention of claim 16 wherein said first and second unobstructed portions of said first radiation beam are each incident upon respective first and second optical devices which produce respective third and fourth beams each being characterized by converging heights and diverging width dimensions and being incident on respective first and second radiation measuring devices;

said first and second radiation measuring devices each being characterized by respective first and second portions performing a sensing function;

said first and second portions each having a first dimension extending parallel to the orientation of the height dimension of said third and fourth beams and a second dimension oriented orthogonal thereto, and said first and second radiation measuring devices being located in respective of said third and fourth beams at a location at which each of said third and fourth beams has a width which is greater than said second dimension of said first and second radiation measuring devices.

27. The invention of claim 26 wherein each of said first and second optical devices each comprises a third and a fourth lens.

28. The invention of claim 27 wherein said third lens is a plano-cylindrical lens and said fourth lens is a negative plano-concave cylindrical lens.

29. The invention of claim 25 further a means for converting the radiation present in said third and fourth beams into a voltage value.

30. The invention of claim 29 wherein said means for converting the radiation present in said third and fourth beams into a voltage value is a first and second photo diode.

* * * * *

UNITED STATES PATENT AND TRADEMARK OFFICE
CERTIFICATE OF CORRECTION

PATENT NO. : 5,608,530
DATED : March 4, 1997
INVENTOR(S) : Donald C. Gates

It is certified that error appears in the above-identified patent and that said Letters Patent is hereby corrected as shown below:

In the Abstract - Line 7 - delete "radiation - which" insert --radiation which--.

Col. 2, Line 67 - After "322'" delete "0".

Col. 3, Line 5, delete "which is"

Col 3, Line 7 - After "-a-" insert --which is--.

Col. 4, Line 2, Claim 10 - After "incident" insert --upon--.

Col. 6, Line 50, Claim 29- After "further" insert --comprising--.

Signed and Sealed this

Ninth Day of December, 1997

Attest:

BRUCE LEHMAN

Attesting Officer

Commissioner of Patents and Trademarks